(12) United States Patent
Garland, Sr. et al.

(10) Patent No.: US 9,606,580 B2
(45) Date of Patent: Mar. 28, 2017

(54) CASE AND MOUNTING APPARATUS FOR A TABLET COMPUTER

(71) Applicants: Darryl D. Garland, Sr., Tiger, GA (US); Ramelle E. Garland, Tiger, GA (US)

(72) Inventors: Darryl D. Garland, Sr., Tiger, GA (US); Ramelle E. Garland, Tiger, GA (US)

( * ) Notice: Subject to any disclaimer, the term of this patent is extended or adjusted under 35 U.S.C. 154(b) by 307 days.

(21) Appl. No.: 14/701,590

(22) PCT Filed: Sep. 25, 2012

(86) PCT No.: PCT/US2012/057082
§ 371 (c)(1),
(2) Date: May 1, 2015

(87) PCT Pub. No.: WO2013/058938
PCT Pub. Date: Apr. 25, 2013

(65) Prior Publication Data
US 2015/0301560 A1 Oct. 22, 2015

Related U.S. Application Data

(60) Provisional application No. 61/549,688, filed on Oct. 20, 2011.

(51) Int. Cl.
A47F 5/00 (2006.01)
G06F 1/16 (2006.01)
G03B 17/56 (2006.01)

(52) U.S. Cl.
CPC ......... G06F 1/1626 (2013.01); G03B 17/561 (2013.01); G03B 17/568 (2013.01); G06F 1/166 (2013.01); *G06F 2200/1633* (2013.01)

(58) Field of Classification Search
USPC .................. 248/309.1, 121; 361/600, 679.01
See application file for complete search history.

(56) References Cited

U.S. PATENT DOCUMENTS

| 6,418,010 | B1 * | 7/2002 | Sawyer | B60R 11/0235 248/918 |
| 6,991,384 | B1 * | 1/2006 | Davis | F16M 11/02 248/187.1 |
| 7,025,274 | B2 * | 4/2006 | Solomon | G06F 1/1669 235/472.01 |
| 7,201,443 | B2 * | 4/2007 | Cilluffo | B60N 2/4876 248/917 |
| 7,780,126 | B2 * | 8/2010 | Law | F16M 11/16 248/168 |
| 7,784,864 | B2 * | 8/2010 | Feder | B60R 7/043 297/188.03 |
| 8,109,681 | B2 * | 2/2012 | McAnulty | F16M 11/041 396/428 |

(Continued)

*Primary Examiner* — Monica Millner
(74) *Attorney, Agent, or Firm* — Robert C. Montgomery; Patent & Design, LP.

(57) ABSTRACT

A case and mounting apparatus for a tablet computer includes a case adapted to encompass a rear surface of the tablet computer and a plurality of mounting assembly accessories for use of the tablet in a hands-free manner. A rear surface of the case includes a plurality of mounting points to attach the case and tablet to a graspable handle, a tripod, a car seat, or an airplane seat fold-down tray.

14 Claims, 13 Drawing Sheets

(56) References Cited

U.S. PATENT DOCUMENTS

| | | | | |
|---|---|---|---|---|
| 8,746,449 B2 * | 6/2014 | Gallagher | ............ | F16M 11/105 206/320 |
| 2003/0128975 A1 * | 7/2003 | Shevick | ................ | G03B 37/00 396/428 |
| 2003/0156836 A1 * | 8/2003 | Ward | .................... | F16M 11/04 396/419 |
| 2006/0237495 A1 * | 10/2006 | Chen | ........................ | A45F 5/02 224/197 |
| 2007/0102612 A1 * | 5/2007 | Seil | ........................ | B60R 11/00 248/311.2 |
| 2009/0005128 A1 * | 1/2009 | Hara | .................. | H04M 1/0233 455/575.1 |
| 2009/0009936 A1 * | 1/2009 | Neu | .................... | H04B 1/3877 361/679.01 |
| 2009/0084705 A1 * | 4/2009 | Justiss | ...................... | A45F 5/02 206/724 |
| 2009/0095854 A1 * | 4/2009 | Forbes | .................. | F16M 11/40 248/176.3 |
| 2010/0258602 A1 * | 10/2010 | Amin | ...................... | A45C 13/30 224/275 |
| 2010/0314508 A1 * | 12/2010 | Bevirt | .................... | F16M 11/04 248/121 |
| 2011/0064401 A1 * | 3/2011 | Desorbo | ................ | G03B 17/00 396/419 |
| 2012/0106043 A1 * | 5/2012 | Murakata | ................ | G06F 1/166 361/679.01 |
| 2012/0125791 A1 * | 5/2012 | Parker | .................... | F16M 11/10 206/45.2 |

* cited by examiner

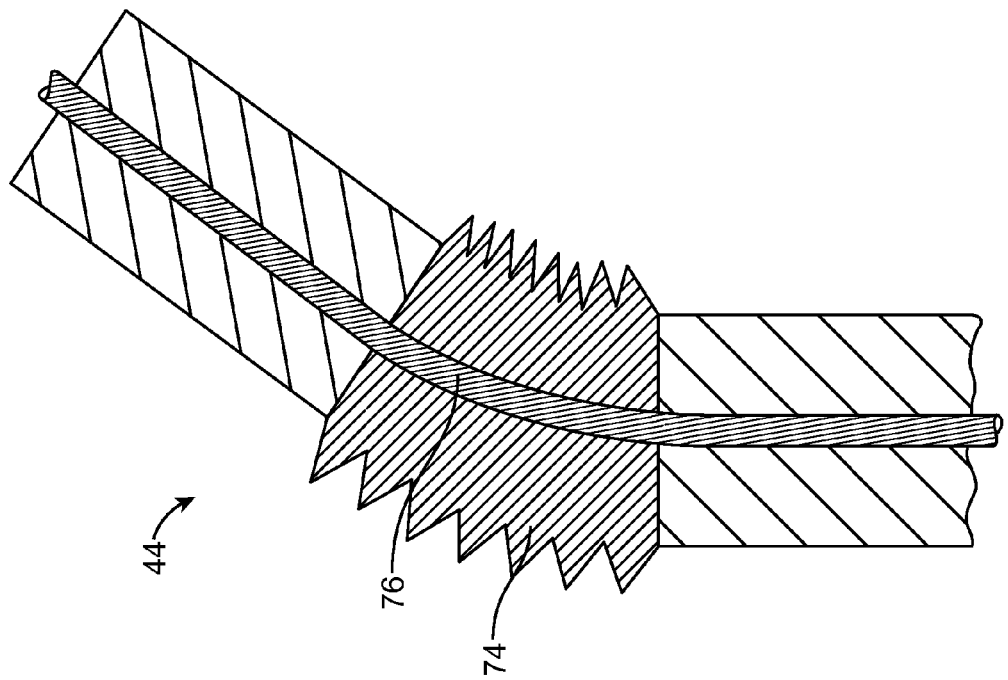
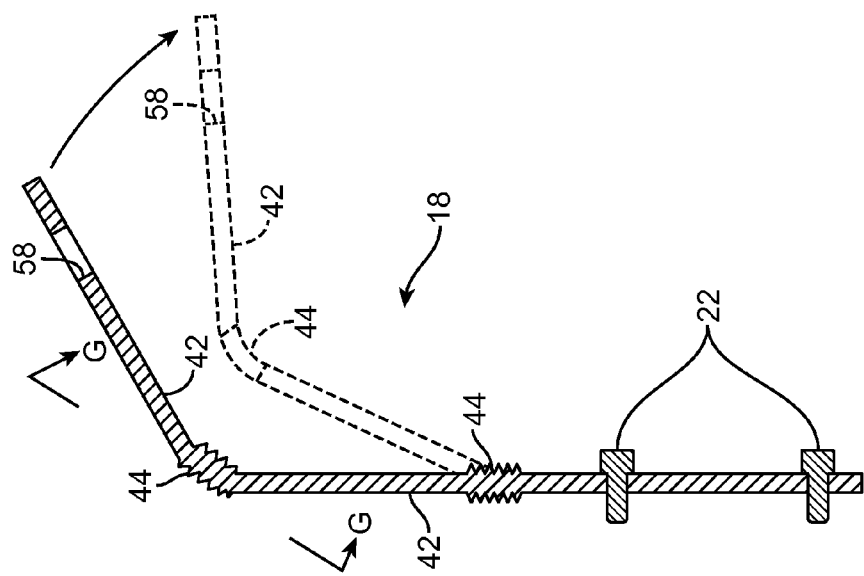
FIG. 10B
FIG. 10A

CASE AND MOUNTING APPARATUS FOR A TABLET COMPUTER

RELATED APPLICATIONS

The present invention is a continuation of, was first described in, and claims the benefit of PCT Application No. PCT/US12/57082, filed Sep. 25, 2012, the entire disclosures of which are incorporated herein by reference.

FIELD OF THE INVENTION

The present invention relates generally to electronic devices, and in particular, to a case and mounting apparatus to protect and support a tablet computer.

BACKGROUND OF THE INVENTION

As personal electronic devices have become more popular, the demand for accessories associated with their use has likewise increased. Of all the personal electronics, smart phones and tablet computers have become a mainstay for business and personal use due to their multiple functions, ease of use, and portability. The tablet computer has evolved from a professional productivity tool to a personal entertainment unit where the user can take, edit, and store photographs and video; watch television and movies; surf the internet; utilize social networks; maintain personal records and journals; and with the explosion in the mobile application market and wireless data communication, do just about anything imaginable.

The most common accessory for the tablet computer must be the protective cover. These covers are available in a variety of designs and materials and usually include a hard-shell case which snaps around the edges of the tablet or a soft-shell sleeve which receives the tablet computer. While the cover protects the tablet computer from damages, the major disadvantage is that the user is still required to hold the device during use. This can become cumbersome when using the tablet computer to watch movies on a long car or airplane trip or when using the device to take pictures or video of memorable events in the user's life.

SUMMARY OF THE INVENTION

In view of these disadvantages, the inventor has recognized a lack in the art and observed that there is a need for a new protective case for a personal tablet computer that includes various mounting assemblies which provide hands-free use of the tablet computer in many locations. The development of the present invention, which will be described in greater detail herein, substantially departs from conventional solutions to provide a new and improved cover and mounting apparatus for a tablet computer and in doing so fulfills this need.

In accordance with features and aspects of one exemplary embodiment consistent with the principles of the present disclosure, a case and mounting apparatus for a tablet computer includes a case assembly having a generally rectangular case body with a solid rear surface and a snap rim feature extending perpendicularly from a perimeter of a front side of the case body rear surface to retainably engage a perimeter edge of a tablet computer. A horizontally spaced-apart pair of integrally molded threaded inserts and a vertically spaced-apart pair of integrally molded threaded inserts extend through the case body rear surface. A generally square cam-lock receptacle is disposed partially through a middle of a back side of the case body rear surface having a tab slot disposed in each inwardly facing surface. A plurality of recessed areas is disposed partially through corner regions of the back side of the case body rear surface. A plurality of variable spaced-apart apertures is disposed completely through the snap rim feature. A plurality of first mounting assemblies is removably attachable to the case assembly. A cam-lock assembly is attachable to the cam-lock receptacle. A plurality of second mounting assemblies is removably attachable to the cam-lock assembly.

In accordance with features and aspects of another embodiment consistent with the principles of the present disclosure, one of the plurality of first mounting assemblies is a handle assembly configured to be held by a human hand. The handle assembly includes a generally "C"-shaped handle having inwardly facing opposing ends and a thumb-screw disposed through each of the opposing ends to threadably attach to the threaded inserts. The handle assembly is attached to the horizontally spaced-apart pair of integrally molded threaded inserts to position the tablet computer in a horizontal position and the handle assembly is attached to the vertically spaced-apart pair of integrally molded threaded inserts to position the tablet computer in a vertical position.

In accordance with features and aspects of another embodiment consistent with the principles of the present disclosure, one (1) of the plurality of first mounting assemblies is a tripod mount assembly configured to be mounted to a tripod. The tripod mount assembly includes a generally "L"-shaped mount frame having a lower horizontal leg and an upper vertical leg. A pair of thumbscrews is disposed through the upper horizontal leg to threadably attach to the threaded inserts. A threaded knob is disposed through the lower vertical leg to threadably attach to a tripod mounting plate of the tripod. The "L"-shaped frame is attached to the horizontally spaced-apart pair of integrally molded threaded inserts to position the tablet computer in the horizontal position and the "L"-shaped frame is attached to the vertically spaced-apart pair of integrally molded threaded inserts to position the tablet computer in the vertical position.

In accordance with features and aspects of another embodiment consistent with the principles of the present disclosure, the cam-lock assembly includes a cam-lock mounting plate having a cam-lock aperture disposed at each end. A generally square cam-lock housing extends outwardly from a middle of the cam-lock plate. The cam-lock housing is suitably sized to be completely inserted within the cam-lock receptacle. Four (4) cam-lock tabs are slidably retained within the cam-lock housing between a retracted position and a deployed position. Each of the cam-lock tabs have a contoured lower end and a rectangular upper end configured to insertably engage within the tab slots when in the deployed position. A cam is rotatably attached within the cam-lock housing having four (4) curved arms in operational contact with the cam-lock tab lower ends. A cam-lock lever is mechanically connected to the cam to actuate the cam between a first rotated state to place the cam-lock tabs in the retracted position and a second rotated state to place the cam-lock tabs in the deployed position. The cam-lock assembly is attachable to the case assembly at any ninety-degree (90°) interval to position the tablet computer in the horizontal and vertical positions.

In accordance with features and aspects of another embodiment consistent with the principles of the present disclosure, one (1) of the second plurality of mounting assemblies is a headrest mount assembly configured to mount to a motor vehicle seat headrest. The headrest assembly includes an upper headrest mount having a horizontally oriented "U"-shaped member configured to engage over a headrest support post of the headrest. A lower headrest plate is affixed to and extending downwardly from a lower edge of the "U"-shaped member having at least one flexible joint assembly. A pair of thumbscrews is disposed through the lower headrest plate to threadably attach to the cam-lock apertures.

In accordance with features and aspects of another embodiment consistent with the principles of the present disclosure, one (1) of the second plurality of mounting assemblies is a seat-tray assembly configured to mount to a fold-down tray of an airline seat. The seat-tray assembly includes a front mounting plate, a top plate perpendicularly affixed to an upper edge of the front mounting plate, and a rear mounting plate having an upper edge perpendicularly affixed to the top plate opposite the front mounting plate. The front mounting plate, top plate, and rear mounting plate form an inverted "U"-shaped member configured to receivably retain an upper edge of the fold-down tray. A plurality of equally spaced grooves extends traversely along an outwardly facing surface of the front mounting plate. An upper adjustable plate includes an upper end hingedly attached to the front mounting plate upper edge and a lower end. A cam-lock mounting plate is hingedly attached to the upper adjustable plate lower end. A lower adjustable plate includes an upper end hingedly attached to the cam-lock plate and a lower end configured to be inserted within a selected one (1) of the plurality of grooves to support the cam-lock mounting plate at a selected position. A pair of thumbscrews is disposed through the cam-lock mounting plate to threadably attach to the cam-lock apertures.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 10*a* is a section view of the headrest mount assembly taken along section line F-F of FIG. 9, in accordance with the present invention;

FIG. 10*b* is a section view of a flexible joint assembly of the headrest mount assembly taken along section line G-G of FIG. 10*a*, in accordance with the present invention;

DESCRIPTIVE KEY

Figure 1:
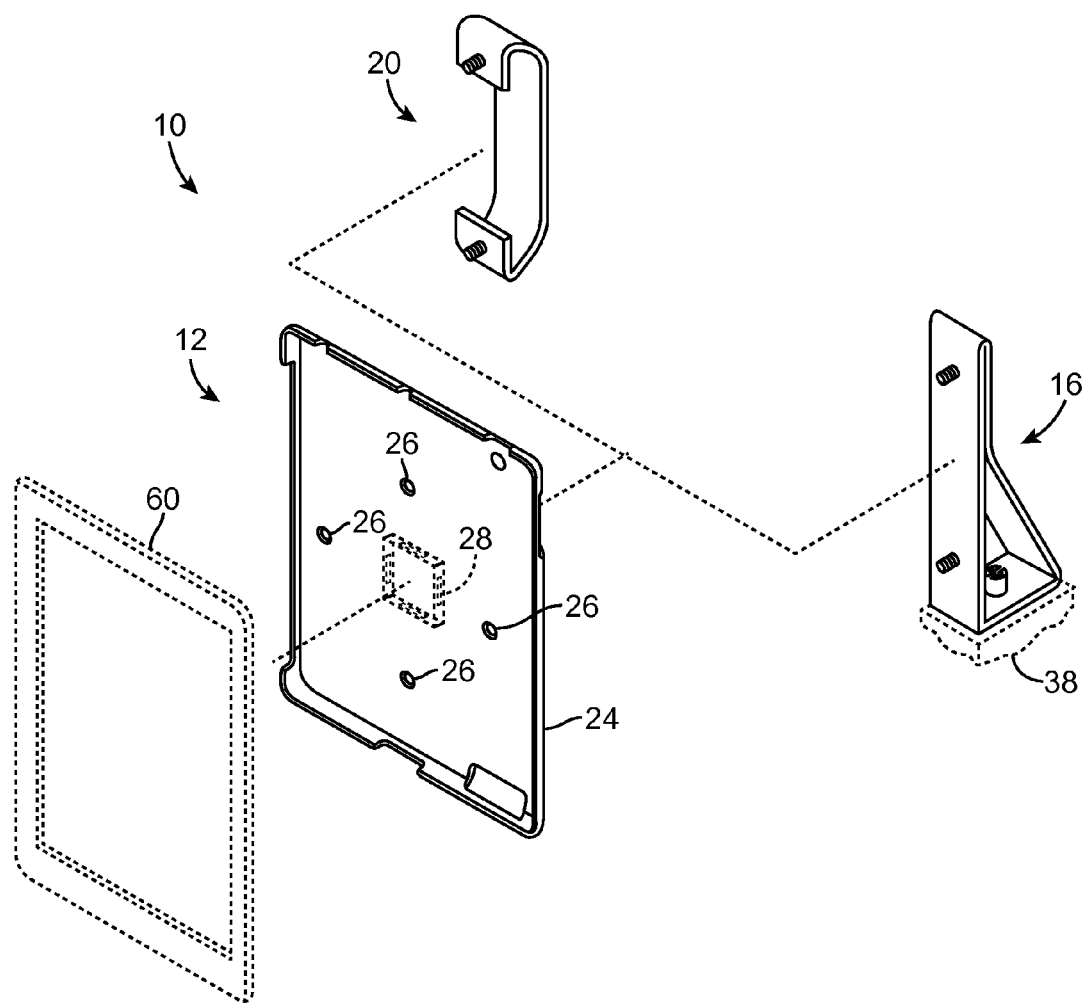
FIG. 1 is an exploded view of a case and mounting apparatus for a tablet computer, in accordance with the present invention.
Figure 2:
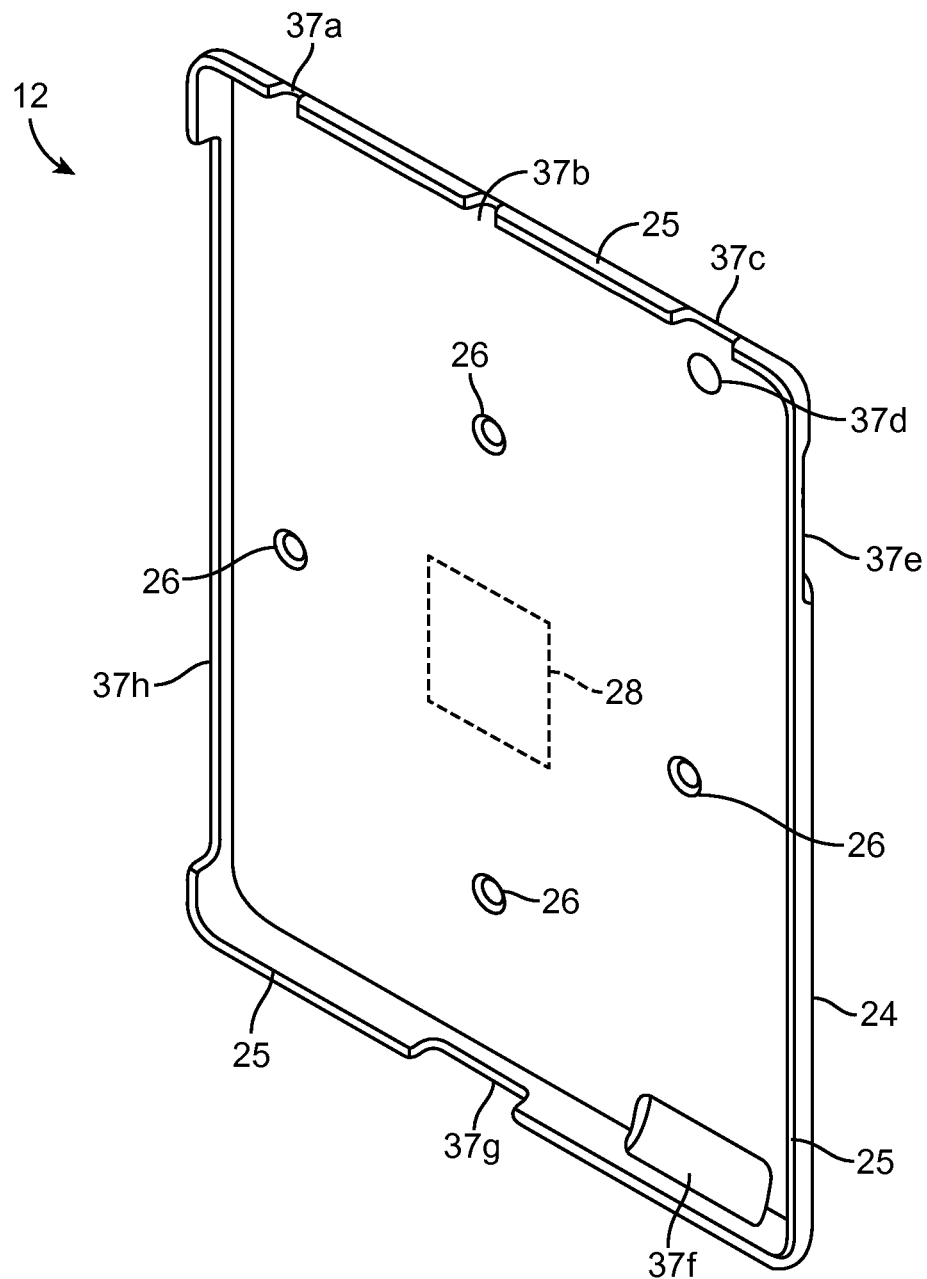
FIG. 2 is a front perspective view of a case of the case and mounting apparatus for a tablet computer, in accordance with the present invention.
Figure 3:
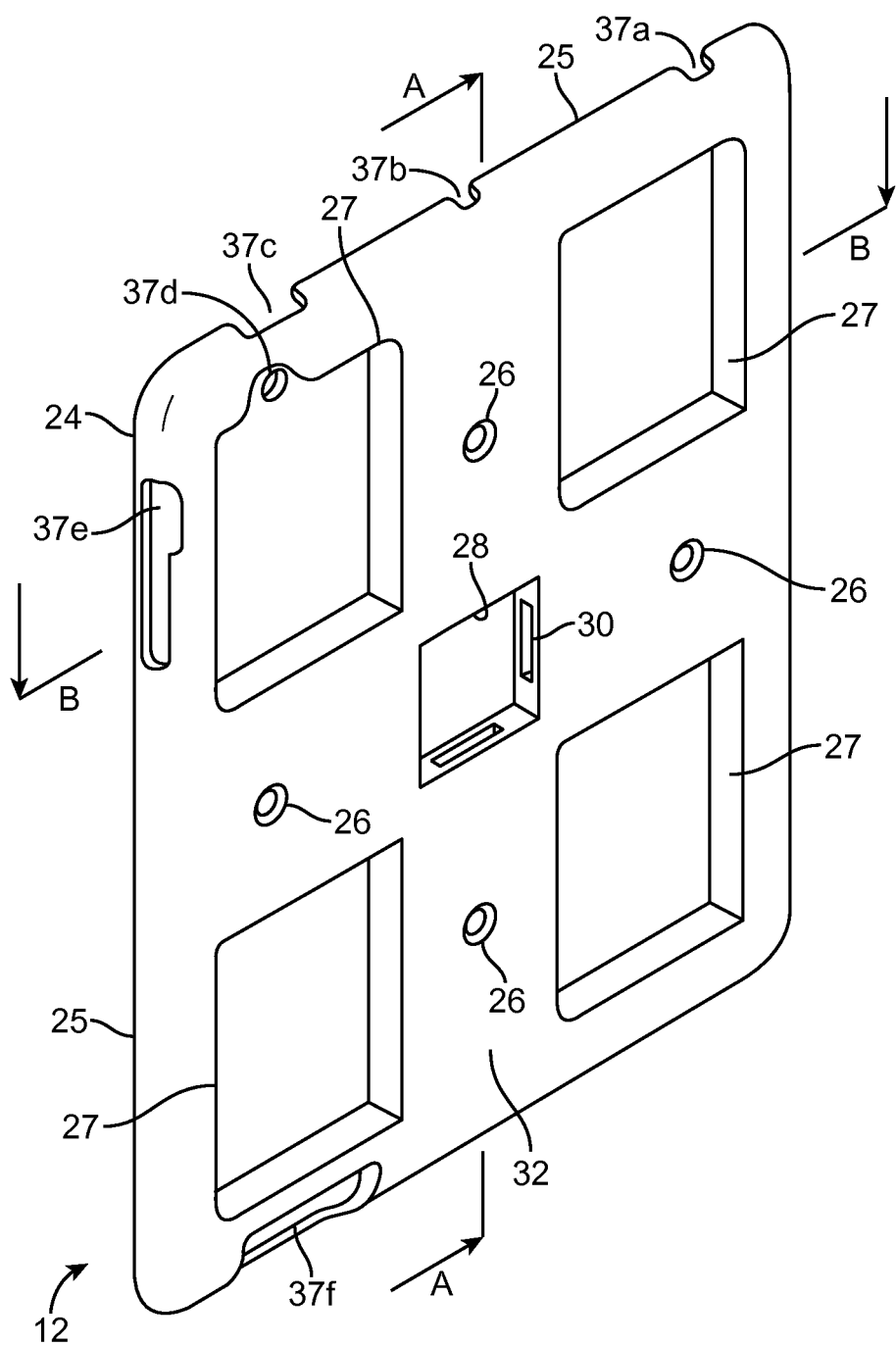
FIG. 3 is a rear perspective view of the case.
Figure 4A:
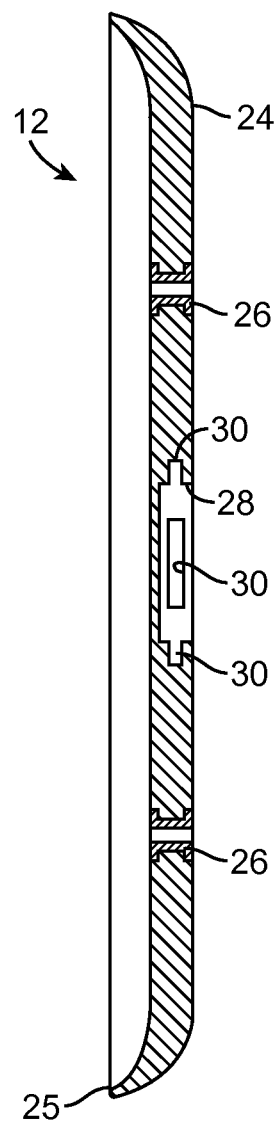
FIG. 4*a* is a section view of the case taken along section line A-A of FIG. 3, in accordance with the present invention.
Figure 4B:
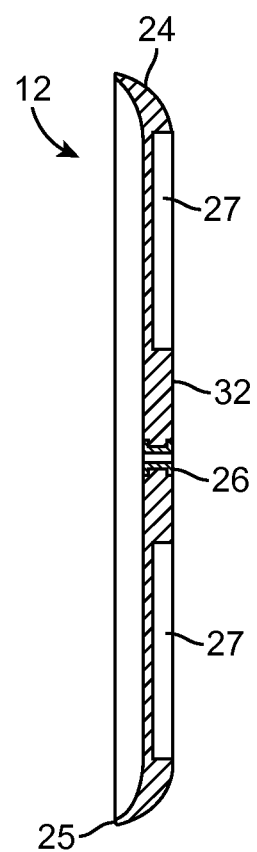
FIG. 4*b* is a section view of the case taken along section line B-B of FIG. 3, in accordance with the present invention.

10 case and mounting apparatus for a tablet computer
12 case assembly
14 cam-lock assembly
16 tripod mount assembly
18 headrest mount assembly
20 handle assembly
21 captive thumbscrew
22 knob
23 fastener aperture
24 case
25 snap rim feature
26 threaded insert.
27 recessed area
28 cam-lock receptacle
30 tab slot.
32 rear surface
36 tripod mount frame
37*a* first aperture
37*b* second aperture
37*c* third aperture
37*d* fourth aperture
37*e* fifth aperture
37*f* sixth aperture
37*g* seventh aperture
37*h* eighth aperture
38 tripod mounting plate
40 handle
42 headrest mount
43 headrest plate
44 flexible joint assembly
46 cam-lock housing
48 cam 50 cam-lock locking lever
51a first indentation
51b second indentation
52 cam-lock tab
53 cam-lock slot
54 cam-lock shaft
56 cam-lock mounting plate
57 cam-lock aperture
58 headrest mount slot
60 tablet computer
62 camera remote
64 USB connector
66 pause/record button
68 zoom adjustment
70 strap
72 user
74 flexible section
76 internal cable
80 seat-tray mount assembly
82 front mounting plate
83 groove
84 rear mounting plate
85 top plate
86 cam-lock mounting plate
88 upper adjustable plate
89 lower adjustable plate
92 hinge
94 tray
96 seat

DETAILED DESCRIPTION OF THE PREFERRED EMBODIMENT

In accordance with the invention, the best mode is presented in terms of certain embodiments, herein depicted within FIGS. 1 through 12. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps or functions without precluding one or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring now to FIGS. 1 through 12, depicting a case and mounting apparatus for a tablet computer, identified generally by reference to an apparatus 10, where like reference numerals represent similar or like parts. In accordance with the teachings of the present disclosure, the apparatus 10 generally provides a case to hold and protect a tablet computer 60, such as an IPAD®, and a plurality of mounting assemblies for "hands-free" mounting of the tablet computer 60 including a photography tripod mount assembly 16, a headrest mount assembly 18, a handle assembly 20, and a seat-tray assembly 80.

Except for provided metallic threaded inserts 26, all remaining components of the apparatus 10 can be manufactured using a plastic injection molding process, preferably using an impact-resistant plastic such as polycarbonate or an equivalent material. A case assembly 12 provides for attachment of various accessories 14, 16, 18, 20, 80, which will be described in more detail herein. The various accessories 14, 16, 18, 20, 80 are not necessary for the operation of the tablet computer 60, however when added, enable the tablet computer 60 to be more useable, versatile, and capable. By interchanging the selected accessory 14, 16, 18, 20, 80, the specific function of the tablet computer 60 is changed.

Referring first to FIGS. 1 through 4b; the case assembly 12 attaches to the tablet computer 60 for exterior protection. The case assembly 12 includes a rectangular case 24 having an integrally-molded snap rim feature 25 which provides secure mechanical attachment of the case 24 to the perimeter of the tablet computer 60. The snap rim feature 25 extends perpendicularly from around a perimeter of the case 24 and snaps over and around the perimeter edge of the tablet computer 60 on all sides fitting securely up to the edge of a glass screen of the tablet computer 60. The case 24 also includes a plurality of mounting locations which are permanently molded in and ready for use as needed. The apparatus 10 is designed to combine the protection of a hard-shell case and to mount the selected accessories 16, 18, 20, 80.

Although the case assembly 12 is illustrated here having a particular height and width, it can be appreciated that case assembly 12 can be suitably sized to fit other popular commercially available and future models of tablet computers and is not meant to be limiting in any manner.

The case 24 includes four (4) integrally-molded metallic threaded inserts 26 which provide for threaded attachment of non-rotating accessories, including the tripod assembly 16 and handle assembly 20, along a rear surface 32 at user selected vertical or horizontal orientations, as best seen in FIGS. 5a, 5b, 6a, and 6b. The threaded inserts 26 are arranged in an equally spaced-apart manner and orientated in a generally diamond pattern. A plurality of recessed areas 27 extend inwardly into a rear surface 32 of the case 24, approximately one-half (½) of the material thickness, to reduce weight as well as material cost.

Figure 7:
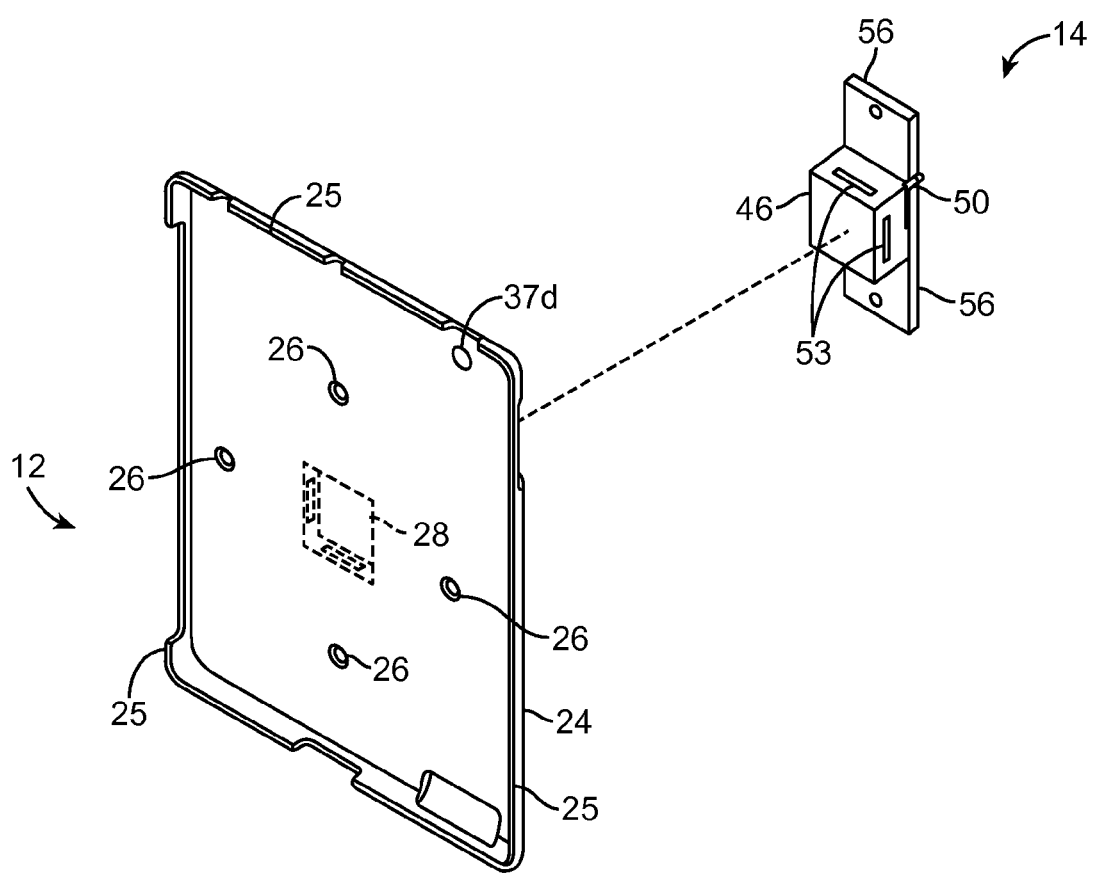
FIG. 7 is an exploded view of the case and mounting apparatus for a tablet computer depicting the case and a cam-lock assembly, in accordance with the present invention.
Figure 8A:
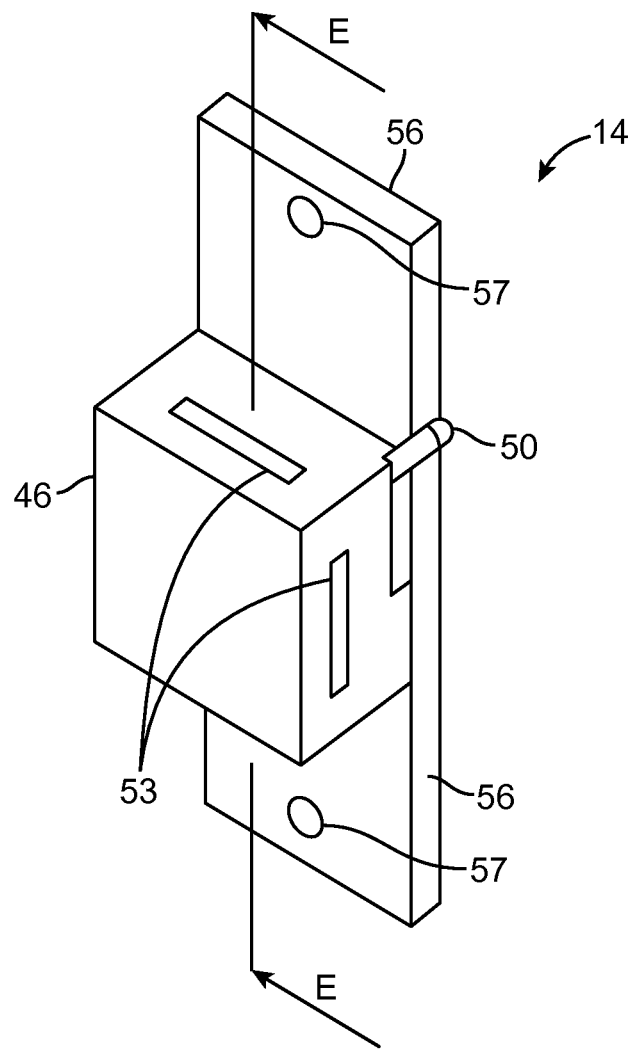
FIG. 8*a* is a perspective view of the cam-lock assembly.
Figure 8B:
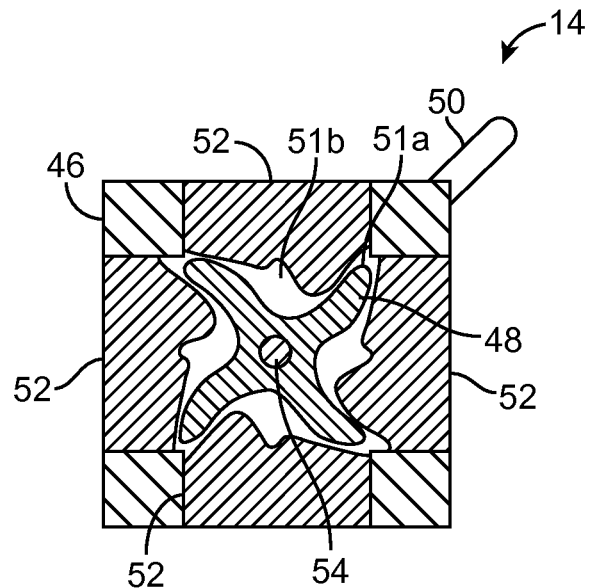
FIG. 8*b* is a section view of the cam-lock assembly taken along section line E-E of FIG. 8*a* depicted in a first rotated state, in accordance with the present invention.
Figure 8C:
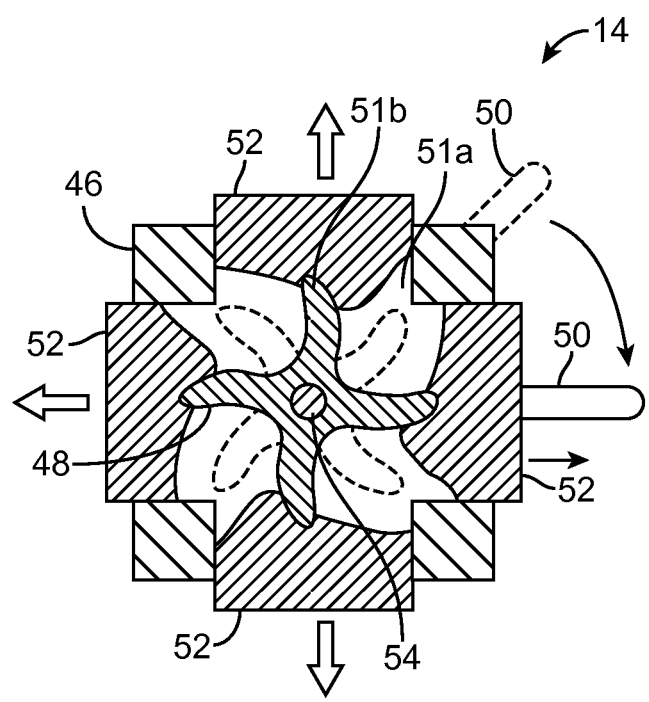
FIG. 8*c* is a section view of the cam-lock assembly taken along section line E-E of FIG. 8*a* depicted in a second rotated state, in accordance with the present invention.

The case 24 further includes a centrally-located cam-lock receptacle 28 to receive removable attachment of a mating cam-lock assembly 14. As will be described in further detail herein, the cam-lock assembly 14 provides rotational attachment of accessories including the headrest mount assembly 18 and the seat-tray mount assembly 80. The cam-lock receptacle 28 is a square depression formed into the rear surface 32 of the case 24 extending approximately one-half (½) the thickness. The cam-lock receptacle 28 includes four (4) tab slots 30, one (1) on each inwardly facing surface, which receive respective cam-lock tabs 52 of the cam-lock assembly 14, as seen in FIGS. 7 through 8c.

The illustrated embodiment of the case 24 includes a first aperture 37a, a second aperture 37b, a third aperture 37c, a fourth aperture 37d, a fifth aperture 37e, a sixth aperture 37f, a seventh aperture 37g, and an eighth aperture 37h. The apertures 37a-37h provide access to various features commonly disposed along external edges and the rear surface of the tablet computer 60 such as, but not limited to: pushbuttons, switches, speakers, camera lens, and the like. It can be appreciated that the number of and position of the apertures 37a-37h can vary based upon final design criteria for particular models of the tablet computer 60 and is not meant to be limiting in any manner.

Figure 5A:
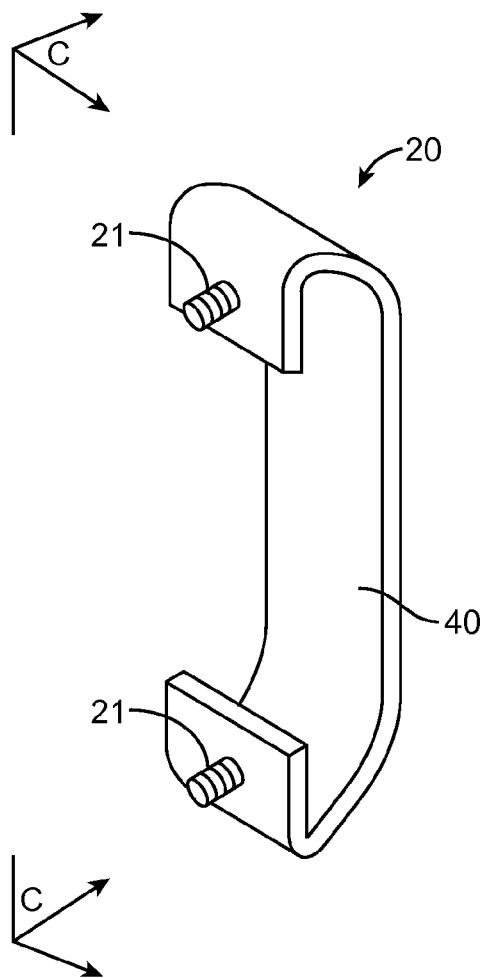
FIG. 5*a* is a perspective view of a handle mount assembly of the case and mounting apparatus for a tablet computer, in accordance with the present invention.
Figure 5B:
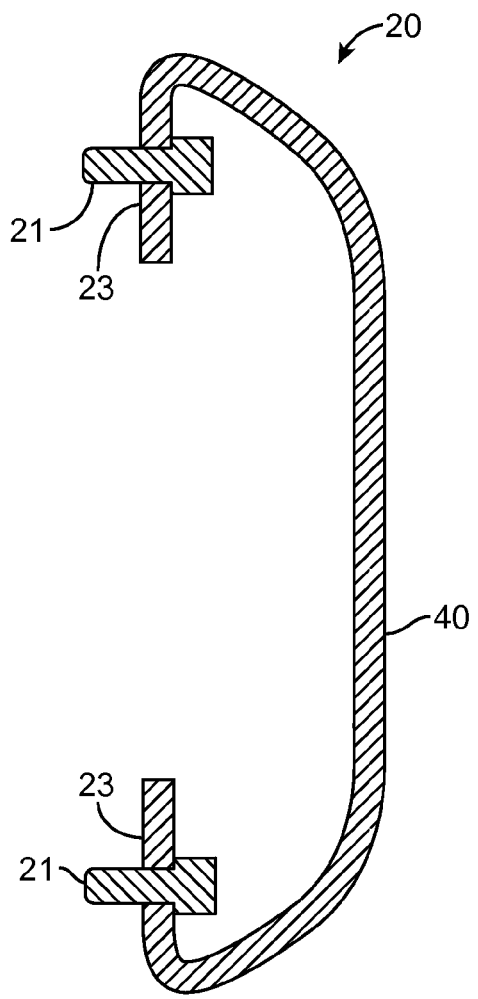
FIG. 5*b* is a section view of the handle mount assembly taken along section line C-C of FIG. 5*a*, in accordance with the present invention.

Referring now to FIGS. 5a and 5b, a handle assembly 20 includes a generally "C"-shaped handle 40 having a pair of captive thumbscrews 21 mounted to each opposing end. Each thumbscrew 21 being positioned and sized for threaded attachment to respective threaded inserts 26 on the rear surface 32 of the case 24. Once installed upon the case 24, the handle assembly 20 can be gripped and held securely using one (1) hand to provide a comfortable and ergonomic handling attachment during extended use of the case assembly 12 and tablet computer 60, in combination.

Figure 6A:
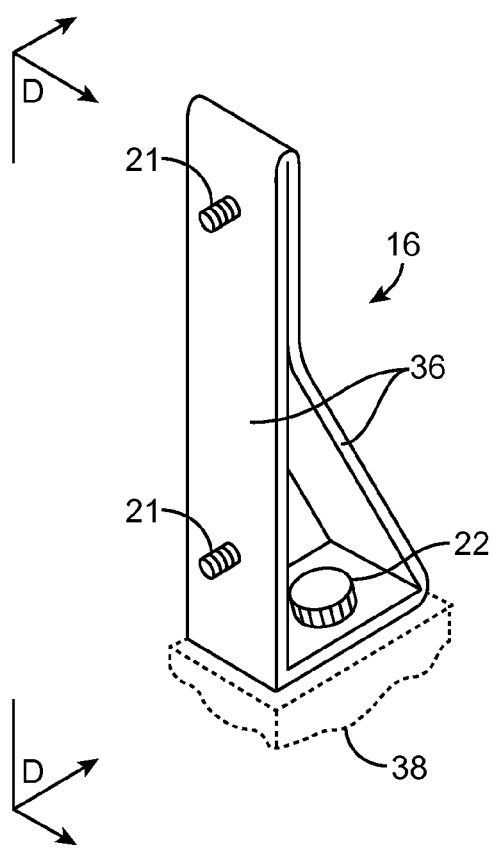
FIG. 6*a* is a perspective view of a tripod mount assembly of the case and mounting apparatus for a tablet computer, in accordance with the present invention.
Figure 6B:
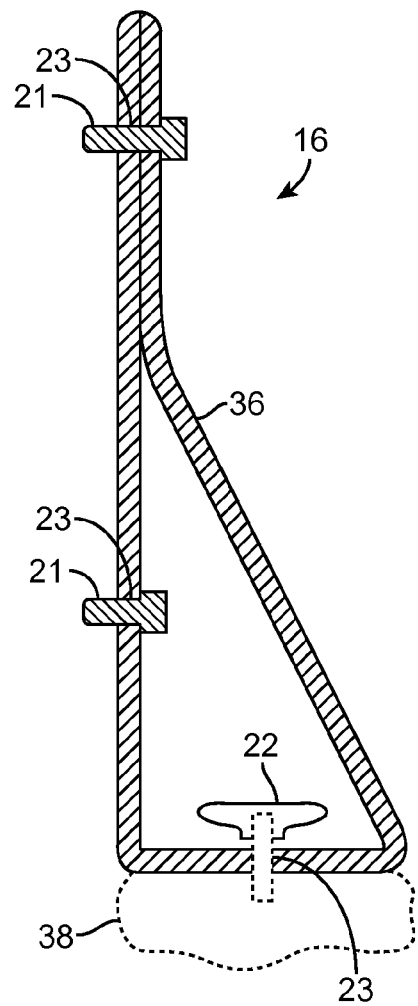
FIG. 6*b* is a section view of the tripod mount assembly taken along section line D-D of FIG. 6*a*, in accordance with the present invention.

Referring now to FIGS. 6a and 6b, a tripod mount assembly 16 provides for attachment of the case assembly 12 and tablet computer 60, in combination, to a tripod mounting plate 38. The tripod mount assembly 16 allows the tablet computer 60 to perform photography and video recording functions in a hands-free manner. The tripod mount assembly 16 includes a generally "L"-shaped tripod mount frame 36 having a bottom horizontal leg having a knurled knob 22 and corresponding fastener aperture 23 for threaded attachment to an ARCA-type quick-attach base or equivalent attachment commonly utilized for mounting various photography equipment to a tripod. A vertical leg of the tripod mount frame 36 includes a pair of captive thumbscrews 21 positioned and sized for threaded attachment to respective threaded inserts 26 on the rear surface 32 of the case 24. The tripod mount assembly 16 allows for positioning of the secured tablet computer 60 in any direction at portrait or landscape orientations. Additionally, the apparatus 10 includes a finger-mounted camera remote 62 which provides wireless control of shutter activation and zoom functions of an existing camera application within the tablet computer 60.

Referring now to FIGS. 7 through 8c, the rear surface 32 of the case 24 the cam-lock receptacle 28 for removable attachment of the cam-lock assembly 14. When installed upon the case 24 and tablet computer 60, in combination, the cam-lock assembly 14 can be mounted to various accessories in a lockable rotating manner. The cam-lock assembly 14 includes a rectangular cam-lock mounting plate 56 having a pair of opposing cam-lock apertures 57 for mounting purposes. The cam-lock mounting plate 56 includes an intermediate cam-lock housing 46 which is completely interested into the cam-lock receptacle 28. The cam-lock housing 46 protrudes from a front surface of the cam-lock mounting plate 56.

To mount the cam-lock assembly 14 to the tablet computer 60, the square cam-lock housing 46 is inserted into the square cam-lock receptacle 28 of the case 24 and a protruding cam-lock locking lever 50 is rotated clockwise forty-five degrees (45°), which translates to one-eighth (⅛) of a turn an internal cam 48. The cam 48 rotates about a centrally located cam-lock shaft 54. To provide smooth and easy rotation, the cam 48 includes four (4) spiral curved arms having a continuously changing radius. The Rotating the cam-lock locking lever 50 rotates the internal cam 48, which in turn extends four (4) cam-lock tabs 52 out of corresponding cam-lock slots 53 and into the corresponding tab slots 30 of the case 24. In a first rotated state, the arms of the cam 48 reside within four (4) corresponding first indentations 51a defined by interior sides of the cam-lock tabs 52. The cam-lock tabs 52 are retracted and within the cam-lock housing 46 when the cam 48 is in the first rotated state. As the cam 48 rotates and the cam-lock locking lever 50 nears its travel limit, the arms the cam 48 positively snap into corresponding second indentations 51b disposed on interior sides of the cam-lock tabs 52, thereby preventing retraction of the cam-lock tabs 52 during use.

To release the cam-lock assembly 14, the cam-lock locking lever 50 is rotated in a counterclockwise direction allowing the ends of the arms of the cam 48 to snap out of the second indentations 51b and return to the first indentations 51a and return the spring-loaded cam-lock tabs 52 to the retracted and closed position.

The cam-lock assembly 14 can be mounted at any selected ninety degree (90°) interval allowing the case assembly 12 and tablet computer 60, in combination, to be positioned at a desired angle.

Figure 9:
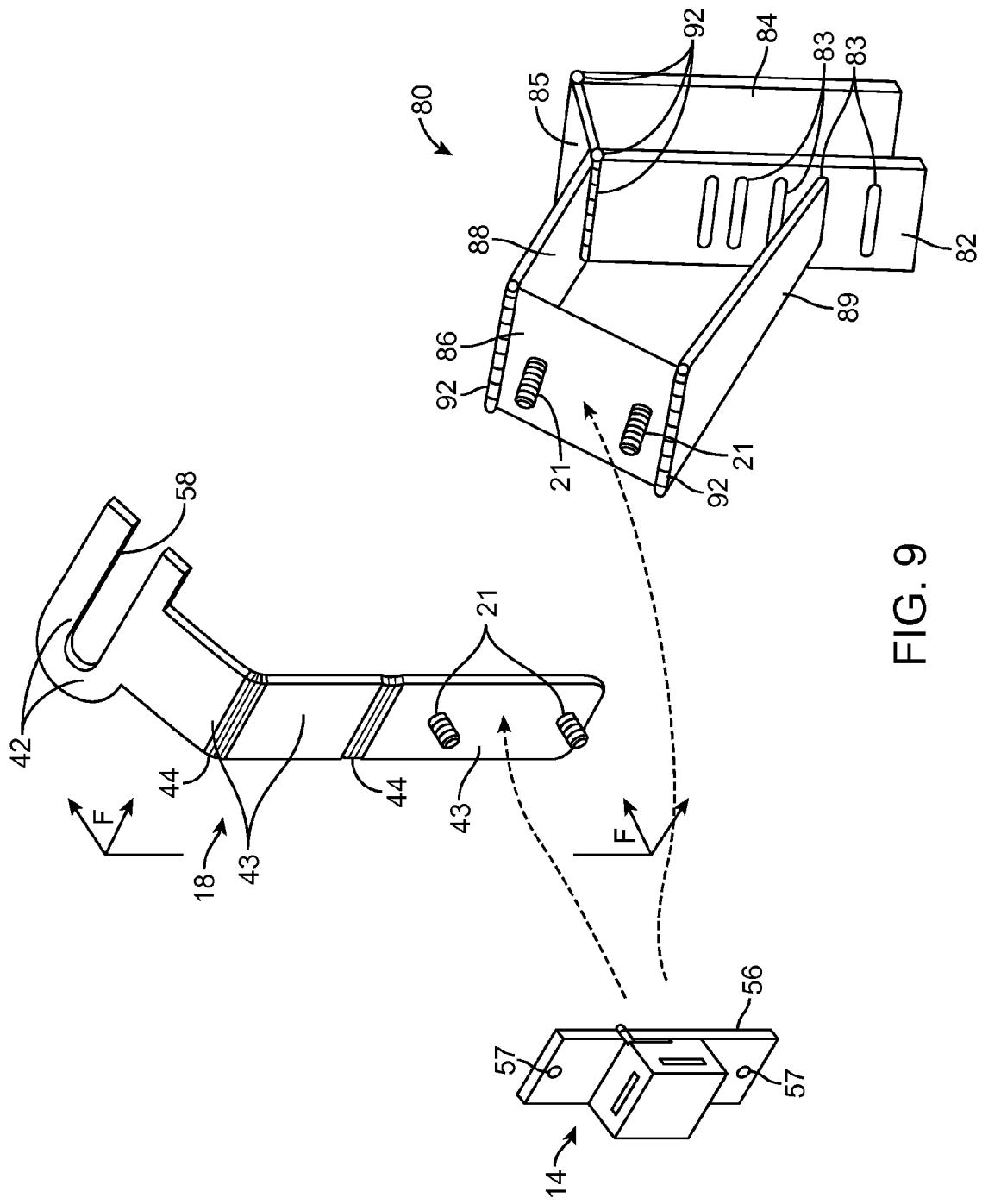
FIG. 9 is an exploded view of the cam-lock assembly with a headrest mount assembly and a seat-tray mount assembly, in accordance with the present invention.
Figure 11:
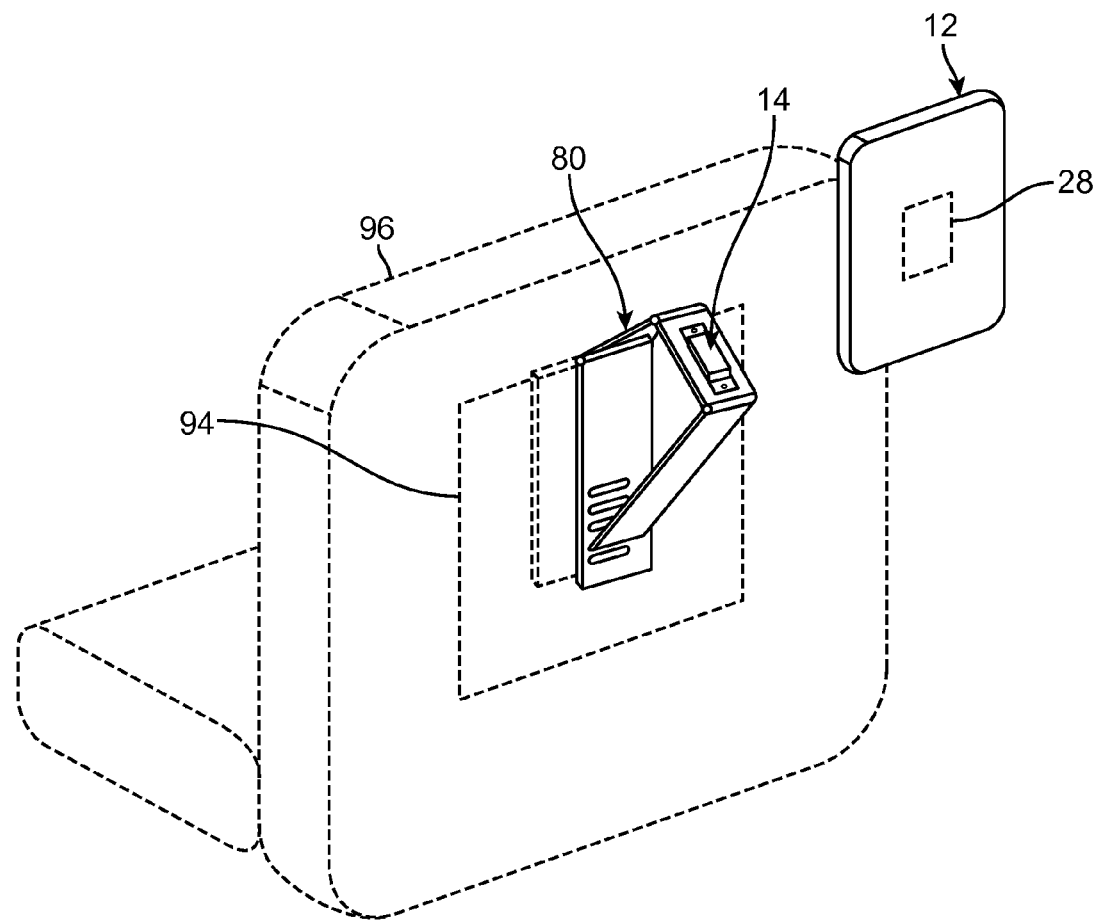
FIG. 11 is an environmental view of the seat-tray mount assembly depicted as attached to a seatback tray, in accordance with the present invention; and, FIG. 12 is a perspective view of a camera remote of the case and mounting apparatus for a tablet computer, in accordance with the present invention.

Referring now to FIG. 9 through 11, the apparatus 10 also includes a headrest mount assembly 18 and a seat-tray mount assembly 80. The headrest mount assembly 18 and seat-tray mount assembly 80 are attachable to and work in conjunction with the cam-lock assembly 14 to attach the tablet computer 60 to respective vehicle headrest or airplane fold-down tray 94. The headrest mount assembly 18 and the seat-tray mount assembly 80 each include a pair of captive thumbscrews 21 which are sized and positioned for threaded attachment to corresponding threaded cam-lock apertures 27 of the cam-lock assembly 14. The cam-lock assembly 14 is in turn is attached to the case 24 and tablet computer 60, in combination.

The headrest mount assembly 18 includes a flexible "T"-shaped member having an upper headrest mount 42 and a lower headrest plate 43 which mount the case assembly 12 and tablet computer 60, in combination, to a rear portion of a vehicle headrest or similar appendage specifically suited to keep rear passengers occupied while traveling. The headrest plate 43 is a unitary structure having a pair of intermediate flexible joint assemblies 44. The upper headrest mount 42 includes a horizontal "U"-shaped headrest mount slot 58 which slides between a top of a vehicle seat and the headrest, surrounding the headrest support posts.

The seat-tray mount assembly 80 adjustably attaches the case assembly 12 and tablet computer 60, in combination, to an airplane fold-down tray 94 of a passenger seat 96. The seat-tray mount assembly 80 includes a plurality of hinging plastic or metal panels including a front mounting plate 82, a rear mounting plate 84, a top plate 85, a cam-lock mounting plate 86, an upper adjustable plate 88, and a lower adjustable plate 89; each being rotatingly connected by integrally-molded hinges 92. The front 82, rear 84, and top 85 plates are hingedly attached suitable to fold relative to each other to form an inverted "U"-shaped structure which can be inserted over a top edge of the fold-down tray 94.

The upper adjustable plate 88 hinges and extends towards the user 72 along a distal edge, subsequently having the cam-lock mounting plate 86 being hingedly attached and extending downwardly from a proximal edge of the upper adjustable plate 88. The cam-lock mounting plate 86 can be attached to the cam-lock assembly 14 by a pair of captive thumbscrews 21 which are sized and positioned for threaded attachment to corresponding threaded cam-lock apertures 27 of the cam-lock assembly 14. A lower edge of the cam-lock mounting plate 86 is hinged attachment to a proximal edge of the lower adjustable plate 89 and extends rearwardly where a distal edge of the lower adjustable plate 89 is selectively inserted into one (1) of a plurality of horizontal and equally-spaced grooves 83 formed into the vertical surface of the front mounting plate 82, enabling the user 72 to obtain a desired viewing angle.

The cam-lock assembly 14 is illustrated utilizing the vehicle seat mount assembly 18 and the seat-tray mount assembly 80; however, it can be appreciated that the cam-lock apertures 57 can be mounted to virtually any flat surface such as a wall surface or the like, and is not meant to be limiting in any manner.

As best seen in FIGS. 10*a* and 10*b*, the headrest mount assembly 18 includes a pair of flexible joint assemblies 44 which bendably connect the upper headrest mount 42 and the lower headrest plate 43 in order to adjust a viewing angle for the attached cam-lock assembly 14 and thus the tablet computer 60. Each flexible joint assembly 44 includes a ribbed rubber flexible section 74 having a metal cable 76 molded into a center axis to retain each flexible joint assembly 44 at a desired viewing angle.

As seen in FIG. 11, the seat-tray mount assembly 80 is illustrated mounted to an airplane fold-down tray 94 of a passenger seat 96. The seat-tray mount assembly 80 is removable and reusable and never becomes a permanent airplane seat fixture.

Figure 12:
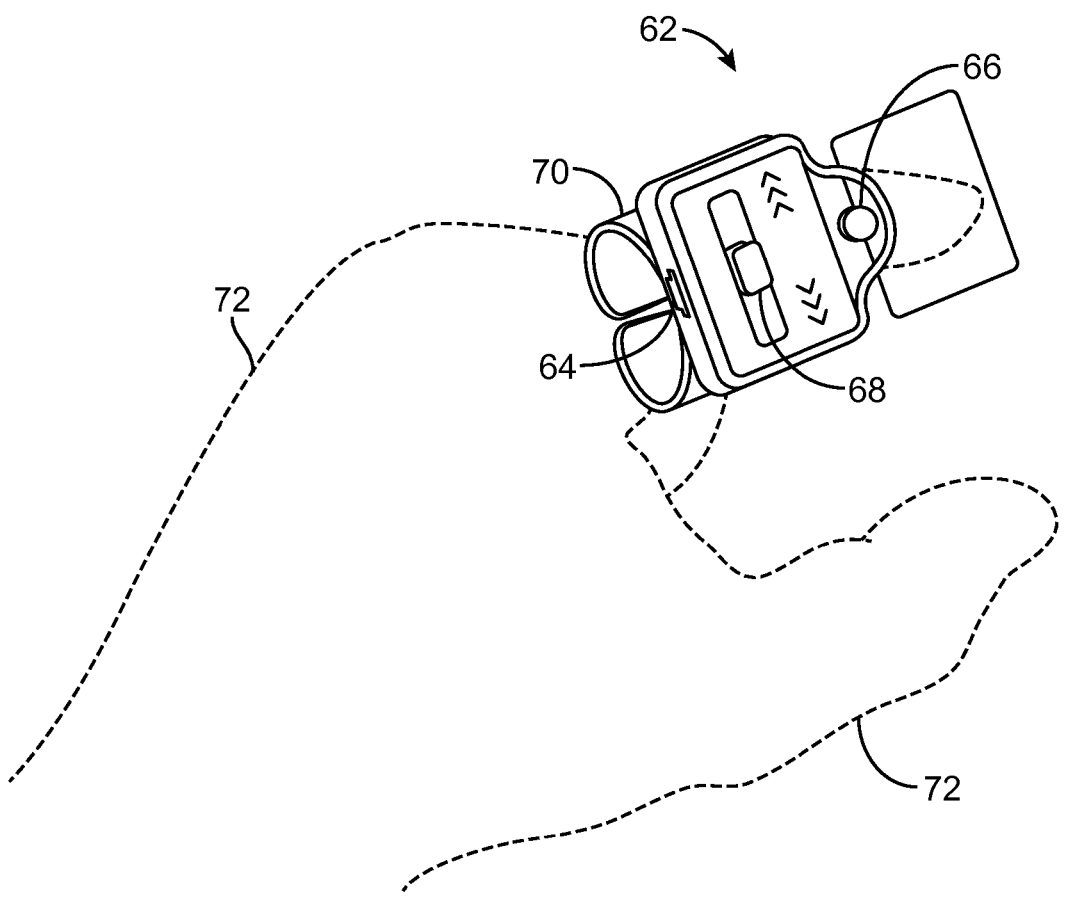

Referring now to FIG. 12, the camera remote 62 uses the proprietary open wireless technology standard called BLUETOOTH® to transmit simple video and photo commands to the tablet computer 60. The remote controller 62 includes a rectangular housing having an integral finger-strap 70 for attachment and use of the controller 62 upon a finger. The camera remote controller 62 includes a USB connector 64, a tablet computer 60 activating pause/record button 66, and a zoom adjustment 68. The USB connector 64 electrically connects the camera remote 62 to a power supply using a USB cable and computer or other USB charging device. The zoom adjustment 68 includes a rheostat-type two-way center-return switch to wirelessly control a focal length of the camera of the tablet computer 60. These controls are placed on separate plains to allow easy non visual tactile only operation. Activation of any switch 66, 68 powers on the remote 62, connects with tablet computer 60, and launches a corresponding computer mobile application. The finger strap 70 is envisioned to be a spring-closed style, cylindrical plastic construction which grips a user's 72 finger. An internal lithium battery provides power to the remote controller 62 which is rechargeable through the USB connector 64.

The buttons of the camera remote 62 are envisioned to operate by pushing the zoom adjustment 68 toward a subject being photographed zooms the camera function inwardly. The zoom rate is variable, increasing in rate as you push the zoom adjustment 68 further from the center position. Pushing the zoom adjustment 68 away from the subject zooms the camera out. The center position of the zoom adjustment 68 is neutral. The pause/record button 66 includes a push button which provides a simple toggle switch function used for pause/record. Pressing the pause/record button 66 will pause recording and pressing again will commence still/video recording.

It can be appreciated by one skilled in the art that other styles and configurations of the present invention can be easily incorporated into the teachings of the present disclosure and only certain particular configurations have been shown and described for purposes of clarity and disclosure and not by way of limitation of scope.

In accordance with the principles of the present invention, the apparatus 10 can be installed and utilized by the user in a simple and effortless manner with little or no training in general accordance with FIG. 1 through FIG. 12. It can be appreciated that the steps required to utilize the apparatus 10, as described, can performed in alternative order and as such should not be viewed as a limiting factor.

The method of installing and utilizing the apparatus 10 upon a tripod for use as a photography or video function can be achieved by performing the following steps: procuring the apparatus 10 along with all or a selected number of accessories illustrated herein; attaching the case assembly 12 around edges of a tablet computer 60; retaining the case assembly 12 upon the tablet computer 60 for continuous protection; attaching the tripod mount assembly 16 to a rear surface 32 of the case assembly 12 and to a tripod mounting plate 38 in either portrait or landscape orientations using respective threaded inserts 26 and captive thumbscrews 21; utilizing the tripod mounting plate 38 to direct a camera function of the tablet computer 60 in a desired direction; providing a charging voltage to charge the camera remote 62 by connecting a powered USB cable to the USB connector 64 of the camera remote 62; attaching the camera remote 62 to a user's 72 finger by inserting the finger portion onto the finger strap 70; and, utilizing the pause/record button 66 and zoom adjustment 68 of the camera remote 62 to capture photo and video images using camera equipment and functionality of the tablet computer 60 to obtain images wirelessly and at a distance.

The method of installing and utilizing the handle assembly 20 of the apparatus 10 can be achieved by performing the following steps: attaching the handle assembly 20 to the rear surface 32 of the case assembly 12 using respective threaded inserts 26 and captive thumbscrews 21; and, utilizing the handle assembly 20 to comfortably hold the case assembly 12 and tablet computer 60 for an extended period of time.

The method of installing and utilizing the cam-lock assembly 14 and headrest mounting assembly 18 can be achieved by performing the following steps: attaching the headrest mounting assembly 18 to the cam-lock assembly 14 using the captive thumbscrews 21 of the headrest mounting assembly 18; attaching the headrest mounting assembly 18 to a rear portion of a vehicle seat headrest or similar appendage; sliding the "U"-shaped headrest mount slot 58 around the headrest support posts; attaching the cam-lock assembly 14 to the case assembly 12 and tablet computer 60, in combination, by inserting the square cam-lock housing 46 into the square cam-lock receptacle 28 of the case assembly 12; securing the cam-lock assembly 14 to the case assembly 12 by rotating the cam-lock locking lever 50 clockwise to expand and insert the cam-lock tabs 52 into corresponding tab slots 30 of the case assembly 12; bending the flexible joint assemblies 44 of the headrest mounting assembly 18 to obtain a desired viewing angle; utilizing the tablet computer 60 in a hands-free manner; and, removing the case assembly 12 and tablet computer 60, in combination, for storage by rotating the cam-lock locking lever 50 counter-clockwise to release and remove.

The method of utilizing the cam-lock assembly 14 with the seat-tray mount assembly 80 can be achieved by performing the following steps: attaching the seat-tray mount assembly 80 to the cam-lock assembly 14 using the captive thumbscrews 21 of the seat-tray mount assembly 80; attaching the seat-tray mount assembly 80 to an airplane fold-down tray 94 of a passenger seat 96 by inserting the tray 94 between front 82 and rear 84 mounting plates of the seat-tray mount assembly 80; retaining the tray 94 in an upright state; attaching the case assembly 12 and tablet computer 60, in combination, to the mounted cam-lock assembly 14 as previously described; selectively inserting the lower adjustable plate 89 into a selected groove 83 of the front mounting plate 82 to obtain a desired viewing angle of the tablet computer 60; utilizing the tablet computer 60 in a hands-free manner; and, removing the case assembly 12 and tablet computer 60, in combination, for storage by rotating the cam-lock locking lever 50 counter-clockwise to release and remove.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A case and mounting apparatus for a tablet computer, said apparatus comprising:
    a case assembly configured to captively receive a tablet computer, comprising:
        a generally rectangular case body having a solid rear surface and a snap rim feature extending perpendicularly from a perimeter of a front side of said case body rear surface and configured to engage a perimeter edge of said tablet computer;
        a plurality of integrally molded threaded inserts extending through said case body rear surface; and,
        a generally square cam-lock receptacle disposed partially through a middle of a back side of said case body rear surface having a tab slot disposed in each inwardly facing surface; and,
    a mounting assembly removably attachable to said case assembly and configured to mount to an external support structure, comprising:
    a cam-lock assembly attachable to said case assembly, said cam-lock assembly comprising:
        a cam-lock mounting plate having a cam-lock aperture disposed at each end;
        a generally square cam-lock housing extending outwardly from a middle of said cam-lock plate, said cam-lock housing being suitably sized to be completely inserted within said cam-lock receptacle;
        four cam-lock tabs slidably retained within said cam-lock housing between a retracted position and a deployed position, each of said cam-lock tabs having a contoured lower end and a rectangular upper end configured to insertably engage within said tab slots when in said deployed position;
        a cam rotatably attached within said cam-lock housing having four curved arms in operational contact with said cam-lock tab lower ends; and,
        a cam-lock lever mechanically connected to said cam to actuate said cam between a first rotated state to place said cam-lock tabs in said retracted position and a second rotated state to place said cam-lock tabs in said deployed position.

2. The apparatus of claim 1, wherein said mounting assembly comprises a handle assembly configured to be held by a human hand, said handle assembly comprising:
    a generally C-shaped handle having inwardly facing opposing ends; and,
    a thumbscrew disposed through each of said opposing ends to threadably attach to said threaded inserts.

3. The apparatus of claim 1, wherein said mounting assembly comprises a tripod mount assembly configured to be mounted to a tripod, said tripod mount assembly comprising:
    a generally "L"-shaped mount frame having a lower horizontal leg and an upper vertical leg;
    at least one thumbscrew disposed through said upper horizontal leg to threadably attach to said threaded inserts; and,
    a threaded knob disposed through said lower vertical leg to threadably attach to a tripod mounting plate of said tripod.

4. The apparatus of claim 1, wherein said cam-lock tab lower ends each further comprises an indentation to retain said cam arms in said second rotated state.

5. The apparatus of claim 1, further comprising a headrest mount assembly configured to mount to a motor vehicle seat headrest, said headrest assembly comprises:
    an upper headrest mount comprising a horizontally oriented "U"-shaped member configured to engage over a headrest support post of said headrest;
    a lower headrest plate affixed to and extending downwardly from a lower edge of said "U"-shaped member having at least one flexible joint assembly; and,
    at least one thumbscrew disposed through said lower headrest plate to threadably attach to said cam-lock apertures.

6. The apparatus of claim 5, wherein said flexible joint assembly comprises a semi-rigid metal cable surrounded by a ribbed rubber covering.

7. The apparatus of claim 1, further comprising a seat-tray assembly configured to mount to a fold-down tray of an airline seat, said seat-tray assembly comprises:
    a front mounting plate, a top plate perpendicularly affixed to an upper edge of said front mounting plate, and a rear mounting plate having an upper edge perpendicularly affixed to said top plate opposite said front mounting plate, wherein said front mounting plate, said top plate, and said rear mounting plate form an inverted "U"-shaped member configured to receivably retain an upper edge of said fold-down tray;
    a plurality of equally spaced grooves extending traversely along an outwardly facing surface of said front mounting plate;
    an upper adjustable plate having an upper end hingedly attached to said front mounting plate upper edge and a lower end;
    a cam-lock mounting plate hingedly attached to said upper adjustable plate lower end;

a lower adjustable plate having an upper end hingedly attached to said cam-lock plate and a lower end configured to be inserted within a selected one of said plurality of grooves to support said cam-lock mounting plate at a selected position; and, at least one thumbscrew disposed through said cam-lock mounting plate to threadably attach to said cam-lock apertures.

8. The apparatus of claim 1, wherein said case assembly further comprises a plurality of recessed areas disposed partially through corner regions of said back side of said case body rear surface.

9. The apparatus of claim 1, wherein said case assembly further comprises a plurality of variable spaced-apart apertures disposed completely through said snap rim feature.

10. A case and mounting apparatus for a tablet computer, said apparatus comprising:
 a case assembly comprising:
  a generally rectangular case body having a solid rear surface and a snap rim feature extending perpendicularly from a perimeter of a front side of said case body rear surface to retainably engage a perimeter edge of a tablet computer;
  a horizontally spaced-apart pair of integrally molded threaded inserts extending through said case body rear surface;
  a vertically spaced-apart pair of integrally molded threaded inserts extending through said case body rear surface;
  a generally square cam-lock receptacle disposed partially through a middle of a back side of said case body rear surface having a tab slot disposed in each inwardly facing surface;
  a plurality of recessed areas disposed partially through corner regions of said back side of said case body rear surface; and,
  a plurality of variable spaced-apart apertures disposed completely through said snap rim feature;
 a plurality of first mounting assemblies removably attachable to said case assembly;
 a cam-lock assembly attachable to said cam-lock receptacle, comprising:
  a cam-lock mounting plate having a cam-lock aperture disposed at each end;
  a generally square cam-lock housing extending outwardly from a middle of said cam-lock plate, said cam-lock housing being suitably sized to be completely inserted within said cam-lock receptacle;
  four cam-lock tabs slidably retained within said cam-lock housing between a retracted position and a deployed position, each of said cam-lock tabs having a contoured lower end and a rectangular upper end configured to insertably engage within said tab slots when in said deployed position;
  a cam rotatably attached within said cam-lock housing having four curved arms in operational contact with said cam-lock tab lower ends; and,
  a cam-lock lever mechanically connected to said cam to actuate said cam between a first rotated state to place said cam-lock tabs in said retracted position and a second rotated state to place said cam-lock tabs in said deployed position;
  wherein said cam-lock assembly is attachable to said case assembly at any ninety-degree interval to position said tablet computer in said horizontal and vertical positions; and, a plurality of second mounting assemblies removably attachable to said cam-lock assembly;
 wherein one of said plurality of first mounting assemblies is a handle assembly configured to be held by a human hand, said handle assembly comprises:
  a generally C-shaped handle having inwardly facing opposing ends; and,
  a first thumbscrew disposed through each of said opposing ends to threadably attach to said threaded inserts;
 wherein said handle assembly is attached to said horizontally spaced-apart pair of integrally molded threaded inserts to position said tablet computer in a horizontal position and said handle assembly is attached to said vertically spaced-apart pair of integrally molded threaded inserts to position said tablet computer in a vertical position;
 wherein another one of said plurality of first mounting assemblies is a tripod mount assembly configured to be mounted to a tripod, said tripod mount assembly comprises:
  a generally L-shaped mount frame having a lower horizontal leg and an upper vertical leg;
  a pair of second thumbscrews disposed through said upper horizontal leg to threadably attach to said threaded inserts; and,
  a threaded knob disposed through said lower vertical leg to threadably attach to a tripod mounting plate of said tripod;
 wherein said L-shaped frame is attached to said horizontally spaced-apart pair of integrally molded threaded inserts to position said tablet computer in said horizontal position and said L-shaped frame is attached to said vertically spaced-apart pair of integrally molded threaded inserts to position said tablet computer in said vertical position.

11. The apparatus of claim 10, wherein one of said second plurality of mounting assemblies is a headrest mount assembly configured to mount to a motor vehicle seat headrest, said headrest assembly comprises:
 an upper headrest mount comprising a horizontally oriented "U"-shaped member configured to engage over a headrest support post of said headrest;
 a lower headrest plate affixed to and extending downwardly from a lower edge of said "U"-shaped member having at least one flexible joint assembly; and,
 a pair of thumbscrews disposed through said lower headrest plate to threadably attach to said cam-lock apertures.

12. The apparatus of claim 11, wherein one of said second plurality of mounting assemblies is a seat-tray assembly configured to mount to a fold-down tray of an airline seat, said seat-tray assembly comprises:
 a front mounting plate, a top plate perpendicularly affixed to an upper edge of said front mounting plate, and a rear mounting plate having an upper edge perpendicularly affixed to said top plate opposite said front mounting plate, wherein said front mounting plate, said top plate, and said rear mounting plate form an inverted "U"-shaped member configured to receivably retain an upper edge of said fold-down tray;
 a plurality of equally spaced grooves extending traversely along an outwardly facing surface of said front mounting plate;
 an upper adjustable plate having an upper end hingedly attached to said front mounting plate upper edge and a lower end;

a cam-lock mounting plate hingedly attached to said upper adjustable plate lower end;

a lower adjustable plate having an upper end hingedly attached to said cam-lock plate and a lower end configured to be inserted within a selected one of said plurality of grooves to support said cam-lock mounting plate at a selected position; and, a pair of thumbscrews disposed through said cam-lock mounting plate to threadably attach to said cam-lock apertures.

13. The apparatus of claim 12, wherein said flexible joint assembly comprises a semi-rigid metal cable surrounded by a ribbed rubber covering.

14. The apparatus of claim 13, further comprising a camera remote controller in wireless communication with said tablet computer.

\* \* \* \* \*